(12) United States Patent
Tzvetkov

(10) Patent No.: US 8,761,205 B2
(45) Date of Patent: Jun. 24, 2014

(54) METHOD FOR TRANSMITTING AND CONFIGURING A DATA PACKET IN A NETWORK

(75) Inventor: Vesselin Dimitrov Tzvetkov, Oberursel (DE)

(73) Assignee: Vodafone Holding GmbH, Duesseldorf (DE)

( * ) Notice: Subject to any disclaimer, the term of this patent is extended or adjusted under 35 U.S.C. 154(b) by 217 days.

(21) Appl. No.: 13/136,950

(22) Filed: Aug. 15, 2011

(65) Prior Publication Data

US 2012/0189008 A1    Jul. 26, 2012

(30) Foreign Application Priority Data

Aug. 13, 2010    (DE) .......................... 10 2010 034 307

(51) Int. Cl.
*H04J 3/00*        (2006.01)
*H04L 12/56*       (2006.01)
(52) U.S. Cl.
CPC ...................................... *H04L 45/20* (2013.01)
USPC .......................................................... 370/476
(58) Field of Classification Search
None
See application file for complete search history.

(56) References Cited

U.S. PATENT DOCUMENTS 6,760,309 B1 *   7/2004  Rochberger et al. .......... 370/235
2008/0267185 A1  10/2008 Biskner

OTHER PUBLICATIONS

Qu et al., "A Typical Noisy Covert Channel in the IP Protocol," 38th Annual International Conference on Security Technology, pp. 189-192 (2004).
Zander et al., "Covert Channels in the IP Time to Live Field," Australian Telecommunication Networks & Applications Conference (ATNAC), Australia, Dec. 2006.

* cited by examiner

*Primary Examiner* — Kevin C Harper
(74) *Attorney, Agent, or Firm* — Kriegsman & Kriegsman

(57) ABSTRACT

The present invention relates to a method for transmitting a data packet in a network, wherein the data packet has a header field containing header data relevant to transmission and a user field, wherein at least one data field containing header data of a first header data type is provided in the header field, and wherein the data packet is transmitted from a transmitter device to a receiver device. In order to make possible a transmission of additional information in the header field without a loss of already existing header data information and without expanding the header data structure, it is proposed according to the invention that in the at least one data field, in addition to the header data of the first header data type, header data of at least one second header data type are also transmitted.

13 Claims, 1 Drawing Sheet

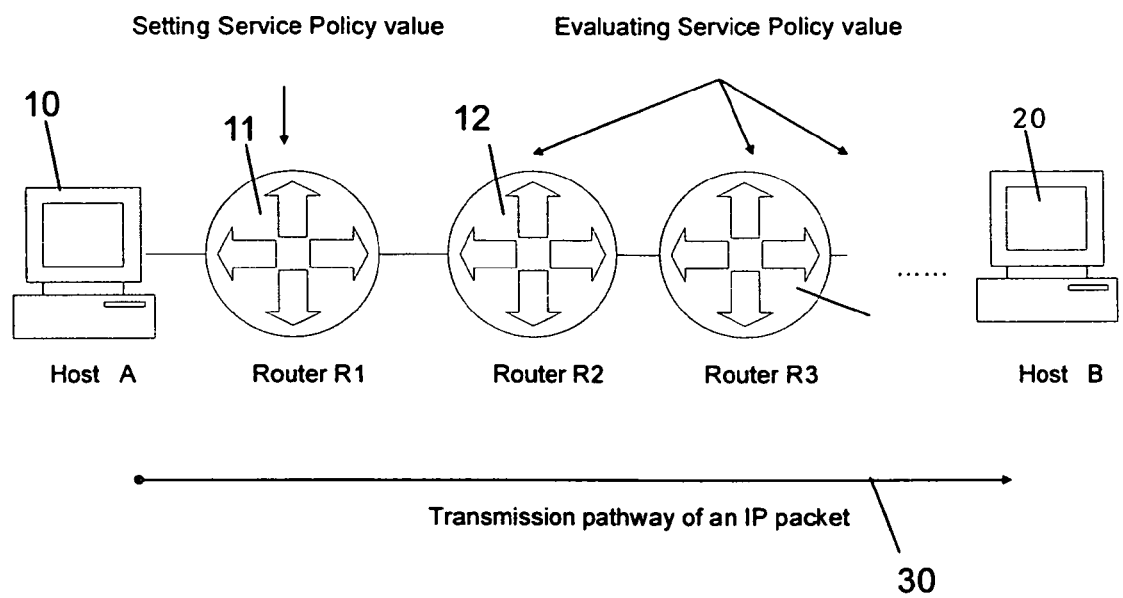

METHOD FOR TRANSMITTING AND CONFIGURING A DATA PACKET IN A NETWORK

BACKGROUND OF THE INVENTION

The present invention first relates to a method for transmitting a data packet in a network according to the preamble of patent claim 1. In addition, the invention relates to a method for configuring a data packet in a network according to the preamble of patent claim 4.

Data packets can be configured in different ways. Data packets frequently provide a header field containing header data relevant for transmission and a user field, wherein at least one data field containing header data of a first header data type is provided in the header field, and wherein the data packet is transmitted by a transmitter device to a receiver device. Data packets are usually transmitted in a network. The network may involve the Internet, for example. In such a case, the data packets are IP packets, in particular. These are data packets according to the Internet protocol.

The data packets are transmitted between a transmitter device and a receiver device, whereby such devices may involve router devices, for example.

Router devices in an IP transmission pathway often require information on the local processing of the packet. The information may be, for example, routing policy, encryption policy, virtual context, and the like. This information cannot be transmitted, for example, in the standard IP header v4 according to RFC 791 without additional, optional fields.

The use of optional fields in IP headers, however, is very impractical, since it leads to an extreme deterioration in router performance due to the loss of the hardware accelerator.

Such a problem is typically avoided by clearly expensive and complicated methods such as VLAN (Virtual Local Area Network), MPLS (Multiprotocol Label Switching), VPLS (Virtual Private LAN Service) and the like.

SUMMARY OF THE INVENTION

The problem of the present invention is based on further developing a method of the type named initially, so that the disadvantages described in the preceding can be avoided. In particular, a solution will be provided that makes possible a transmission of additional information in the header field without a loss of already existing header data information and without expanding the header data structure.

The problem is solved according to the invention by a method for transmitting data packets in a network with the features according to the independent patent claim 1, as well as by the method for configuring a data packet with the features according to the independent patent claim 4. Further features and details of the invention can be taken from the subclaims, the description and the drawing. Thus, features and details that are described in connection with the first aspect of the method of the invention, of course, also apply in connection with the second aspect of the method, and vice versa, so that reference is always made reciprocally to the full extent with respect to the disclosure.

The present invention is based on the basic concept of the invention: that often not all the space is required in the individual data fields in the header field and thus regions in the data fields are unused. Now, these unused regions can be utilized for the transmission of further information.

According to the first aspect of the invention, a method for transmitting a data packet in a network is provided, wherein the data packet has a header field containing header data relevant to transmission and a user field, wherein at least one data field containing header data of a first header data type is provided in the header field, and wherein the data packet is transmitted from a transmitter device to a receiver device. The method is characterized according to the invention in that in the at least one data field, in addition to the header data of the first header data type, header data of at least one second header data type are transmitted.

The present invention relates to a method for transmitting a data packet in a network. The invention is not limited to specific types of data packets. A data packet is particularly an information unit that is transmitted as a whole from a transmitter device to a receiver device. Several advantageous, but non-exclusive examples of data packets will be explained in more detail in the further course of the description. Advantageously, the data packet can be a so-called IP packet. Likewise, the invention is not limited to specific types of networks. Several advantageous, but non-exclusive examples for networks will be explained in more detail in the further course of the description. Advantageously, the network may involve the Internet.

The data packet comprises a header field and a user field. Header data relevant to transmission are contained in the header field of the data packet. In particular, information relevant to a protocol is found in the header data. At least one data field containing header data of a first header data type is provided in the header field. Of course, it frequently happens that several data fields are provided in the header field, whereby each data field contains header data of a specific header data type. The present invention is neither limited to a specific number of data fields nor to a specific configuration of the data fields.

The data packet comprising the header data and the user data is transmitted from a transmitter device to a receiver device. In this case, the invention is not limited to specific configurations of the transmitter device and/or the receiver device. For example, the transmitter device and/or the receiver device can be designed as a router device. A router device, in particular, is a type of switching device in a communications network.

It is now provided according to the invention that in the at least one data field, in addition to the header data of the first header data type, header data of at least one second header data type are also transmitted. In this case, the header data of the first header data type, in particular, are different than the header data of the second header data type.

The invention thus makes possible the transmission of additional information in the header field without a loss of the already existing header field information and without an expansion of the header field structure. Additional space, which can be used for transmitting further information, is created in the header field, particularly in at least individual header data fields.

The solution according to the invention can already be used in most transmitter devices and receiver devices, for example, router devices. It does not lead to a deterioration in performance and it is clearly simple to provide in comparison to the previously known solutions. In many cases, it is only a new type of configuration.

Advantageously, the header data of the at least one second header data type that are transmitted to the receiver device are reconstructed and/or evaluated and/or used by the receiver device. How this can be accomplished in its individual steps will be explained in more detail on the basis of several advantageous, but non-exclusive embodiment examples in the further course of the description.

According to a second aspect of the present invention, a method is also provided for configuring a data packet that will be transmitted in a network from a transmitter device to a receiver device, wherein the data packet has a header field containing header data relevant to transmission and a user field, and wherein at least one data field containing header data of a first header data type is provided in the header field. The method is characterized according to the invention in that in addition to the header data of the first header data type, header data of at least one second header data type are also included in the at least one data field.

For the advantages, effects and mode of operation of the method, reference is made to the full extent to the preceding statements for the first aspect of the method according to the invention, which relates to the transmission of data packets in the network.

Further advantageous configurations of both aspects of the method according to the invention will be explained more closely and in greater detail in the further course of the description.

DETAILED DESCRIPTION OF THE INVENTION

It can be preferably provided that the header data of the at least one second header data type contain information on the local processing of the data packet. In this case, the invention is not limited to certain types of information. For example, it may involve specific instructions or the like. For example, the header data of the at least one second header data type may contain information on the decoding and/or the encrypting and/or the routing policy and/or the virtual context, whereby the invention is not limited, of course, to the named examples.

It is preferably provided that the method is designed for transmitting or configuring an IP packet that is transmitted over the Internet from a transmitter device to a receiver device.

An IP packet particularly involves a data packet according to the Internet protocol, for example, according to the IPv4 protocol. The IP packet comprises two parts, the header field and the user field. The header field particularly contains information on source, destination, status, fragmenting and the like. The information of an IP packet relevant to protocol is found in the header data. In the currently used Version 4 of the protocol, the IPv4, the construction of the header field is established by RFC 791.

The data field containing header data of the first header data type can preferably be designed as a TTL field (Time-To-Live field), wherein header data of at least one second header data type are or will be included in the TTL field.

Time-to-live or TTL is the name of a header region, a so-called header field, of the Internet protocol that prevents undeliverable packets from being endlessly forwarded from one router device to another.

The TTL field comprises an octet, i.e., eight bits, and can thus take up numerical values up to a maximum of 255. The transmitter device of the sender fills this field for the packet that is sent with a value dependent on the implementation or configuration, usually 64, 128 or 255. According to RFC 791, the TTL of packets must be reduced by at least 1 on each router device that the packet passes through on the pathway from the transmitter device to the destination. IP packets with a current TTL of 0 are then discarded by the router device. In the case of data or routing errors, this prevents undeliverable data packets from endlessly roaming around in the network without finding their destination. Thus, for an IP data packet to reach its destination, its initial TTL value must be greater than the maximum possible number of hops. In this case, a value of approximately 30 is usually sufficient for the Internet. The lifetime of an IP packet can be up to 255 hops according to these determinations.

The TTL field has a number of bits. Header data of the first header data type are or will be included in a first sub-number of bits. According to the present invention, it is now provided that header data of the at least one second header data type are or will be included in at least one second sub-number of bits. The TTL field particularly comprises 8 bits, wherein generally only 6 bits are used. In this way, 2 unused bits are available in order to transport additional information according to the present invention.

For example, in the TTL field, five or six or seven bits can be used or will be used for the header data of the first header data type, and three or two or one bit(s) can or will be used for the transmission of header data of the at least one second header data type. It is preferably provided that 2 bits are utilized for the header data of the second header data type.

The solution can already be used in most router devices, it does not lead to any deterioration in performance, and it is clearly simpler to implement. In many cases, it is only a new type of configuration, since many routers already support Access Listen (ACL) with TTL criterion. The invention particularly makes possible the transmission of additional information in the IPv4 header without a loss of the already existing header information and without an expansion of the header structure, so-called backward compatibility. For example, two bits can be gained thereby in the header. These may be used for a transmission of service information. For example, the TTL field can be utilized in a double-sided way in an IPv4 header. New information in addition to the known TTL value can be transmitted. In this way, a dual functionality with backward compatibility is created.

Preferably, the bits used for the transmission of header data of the at least one second header data type span a range of values, whereby information on the local processing of the data packet will be or are assigned at least to individual values of the value range.

According to a preferred embodiment, a value of the TTL field will be set in the transmitter device from the header data of the first header data type and at least one second header data type. The value of the TTL field will be transmitted with the data packet to the receiver device. In the receiver device, at least header data of the at least one second header data type will be reconstructed from the transmitted value of the TTL field.

For better clarification, this will be explained on the basis of a concrete, but non-exclusive example.

If the TTL field has eight bits, six bits that span a value range of 64 can be used for the actual task of the TTL field. Two bits can then be used for the transmission of header data of the second header data type. These two bits span a value range of a magnitude of 2 super 2, i.e., 4. Information on the local processing of the data packet, for example 3 for encrypting, can then be assigned individual values within the value range.

For example, it may be provided that 2 bits were obtained in the TTL field for the new information. These 2 bits can transmit values from one (1) to (4). The bits may represent, for example, 4 profiles for the local processing of the router device. When the data packet is received, the 2 bits will be evaluated and used.

It can be preferably provided that a value of the TTL field from the header data of the first header data type and the at least one second header data type will be set in the transmitter device according to the following formula:

$$TTL \text{ field value} = 2^{bit\ number\ of\ header\ data\ of\ the\ first\ header\ data\ type} * k - 1$$

Here, the variable k corresponds to a value set by the transmitter device, a value that is referred to the header data of the at least one second header data type.

In particular, it can be provided that a value is set by the transmitter device for the variable k, this value being selected from the value range spanned by the bits that are used for the transmission of header data of the at least one second header data type, and are assigned to the information on the local processing of the data packet.

In the Internet, there are practically no more than 63 hops between two end hosts. For this reason, TTL values up to a maximum of 63 are usually sufficient. With this assumption, 2 bits are freed in the TTL field. The existing TTL task is not adversely affected by this, if these two bits are integrated in the following way.

In the transmitter device, the TTL field is set to 64*k−1, wherein k corresponds to a value from one (1) to four (4) due to the two free bits.

In another configuration, header data of the at least one second header data type can be reconstructed in the receiver device from the transmitted value of the TTL field according to the following formula:

$$k = \text{quotient } (TTL \text{ field value}/2^{bit\ number\ of\ the\ header\ data\ of\ the\ first\ header\ data\ type}) + 1$$

Here, the variable k corresponds to a value set by the transmitter device that is referred to the header data of the at least one second header data type. "Quotient" denotes division into whole numbers. This means that after division has been carried out, decimal places are not considered; only the whole number found in front of the decimal point is taken into consideration. For example, if division results in 2.26, the decimal places are not considered, and only the whole number 2 in front of the decimal point is considered.

The technical field that is the basis for the present invention is particularly the use of the Internet Protocol for transmission in networks and here, especially, the use of IP header rows or headers.

In particular, the present invention relates to the use of the TTL field or TTL byte, which is known in the Internet Protocol and which prevents undeliverable packets from endlessly being forwarded from one router device to another.

The present invention makes it possible, in particular, that a specific piece of information can be transmitted between the transmitter device and the receiver device in such a way that the receiver side knows what to do with the data packets.

One basic concept of the invention is thus to utilize the TTL byte. It is known that the value of the TTL byte will be reduced by "1" by passing through one router/hop. The starting value is decimal "255" and could theoretically be counted down to decimal "0" in the transmission of a data packet in a network. In practice, a data packet "travels" over 20 to 30 hops, which means that not all values of this TTL byte will be used.

In the case illustrated in the preceding, only values of up to a maximum of 64 would be used. By abolishing further redundancies, additional information can now be used by the unused bits in the TTL byte.

The transmitter sets the TTL value to k*64−1, wherein the variable k is the value of the desired additional information, for example, a value from 1 to 4. The receiver can extract this additional information with k=quotient (TTL value/64)+1.

In a preferred embodiment, it is particularly provided that 4 specific values of this TTL byte are especially utilized. These four values are "255", "191", "127" and "63". Each individual value represents a specific piece of information for the receiver, e.g., decoding or encrypting or the like.

The invention will now be explained in more detail on the basis of an example of embodiment with reference to the appended drawing. The single FIGURE shows in a schematic representation the sequence of the method according to the invention.

In the example of embodiment shown, a data packet will be transmitted in the form of an IP packet from a first computer 10, host A, to a second computer 20, host B, which is illustrated by arrow 30. In the transmission pathway 30, the data packet passes through a number of router devices 11, 12, 13. In the present example, only three router devices are shown for illustrating the method sequence.

The transmitted data packet 30 has a header field, the so-called header. Data fields containing different header data are found in the header field. A header field involves the TTL field. In addition, the data packet 30 comprises a user field. In the present example of embodiment, the data packet particularly involves an IP packet according to the IPv4 protocol.

The present invention particularly makes possible the transmission of additional information in the IPv4 header without a loss of the already existing header information and without an expansion of the header structure. Two bits of the TTL field are thereby obtained in the header. These may be used for transmission of service information.

Router devices 11, 12, 13 in the IP transmission pathway 30 often require information on the local processing of the data packet. This information may be, for example, routing policy, encryption policy, virtual context, and the like. Previously, this information could not be transmitted in the standard IP header v4 according to RFC 791 without additional, optional fields. The use of optional fields in the IP header, however, is very impractical, since it leads to an extreme deterioration in router performance due to the loss of the hardware accelerator—hardware acceleration, CEF. Up until now, this problem has been typically avoided with clearly expensive and complicated methods such as VLANs, MPLS, VPLS, and the like.

The TTL field or also TTL byte, which comprises eight bits, can now be used in a double-sided manner in the header. New information can be transmitted in addition to the known TTL value. In this way, a dual functionality with backward compatibility is created.

Six bits usually are sufficient for the actual task of the TTL field. Therefore, 2 bits are obtained for the new information, which are also called Service Policy (SP) bits in the following. The two Service Policy (SP) bits transmit values from one (1) to four (4). The Service Policy bits may represent, for example, 4 profiles for the local processing of the router, such as routing policy, encryption policy, and the like. Upon receiving the IP packet, the Service Policy (SP) bits are evaluated and used, for example, in order to insert a matching routing profile. Router devices that do not support the new functionality can ignore the values.

The SP value is set and evaluated by the router devices 11, 12, 13 in the IP transmission pathway 30 between two computers 10, 20. Computer 10, host A, sends the IP packet to computer 20, host B. The router device 11 inserts the Service Policy (SP) value. The subsequent router devices 12, 13 can read out the value and locally use a matching service profile.

In the Internet, there are practically no more than 63 hops between the end hosts, computers 10 and 20. For this reason, TTL values up to a maximum of 63 are basically sufficient. Using this assumption, two free bits are created in the TTL field or TTL byte. The actual existing TTL task is not adversely affected by this, if these two Service Policy (SP)

bits are preferably integrated in the following way: The transmitter, in the present case router device 11, sets the TTL field value according to the following formula:

$$TTL\ field\ value = 2^{bit\ number\ of\ header\ data\ of\ the\ first\ header\ data\ type} * k - 1.$$

The bit number of the header data of the first header data type is the number of bits that are required for the actual task of the TTL field. In the present case, for example, six bits are sufficient. The variable k corresponds to a value set by the transmitter device that is referred to the header data of the at least one second header data type. Here, this is, for example, the above-named Service Policy (SP) value, which corresponds to a value of one (1) to four (4), due to the two bits that are available. Assume that the value for the variable k would be set at 3 in the transmitter device, router device 11. In such a case, the transmitter device sets the value of the TTL field at 191.

The TTL field is transmitted to the receiver device, computer 20, and reconstructed therein. Assume that the data packet has to pass through a number of router devices on its pathway. In each pass through a router device, the value of the TTL field is reduced by "1". This means that the TTL field value in the receiver device is lower than the TTL field value that has been produced in the transmitter device. Assume that the TTL field value in the present example of embodiment amounts to only 145 upon arrival in the receiver device. Then, header data of the at least one second header data type can be reconstructed in the receiver device from the transmitted value of the TTL field according to the following formula:

$$k = quotient\ (TTL\ field\ value / 2^{bit\ number\ of\ the\ header\ data\ of\ the\ first\ header\ data\ type}) + 1$$

It is important here that the quotient denotes division into whole numbers. This means that after division has been carried out, decimal places are not considered; only the whole number found in front of the decimal point is taken into consideration.

If the receiver device receives a TTL field value of 145, the variable k, which corresponds to the value set by the transmitter device that is referred to the header data of the at least one second header data type, is calculated as:

$$k = 145/64 + 1 = 2.26 + 1 = 2 + 1 = 3$$

In this way, the further information in the TTL field that is transmitted by the transmitter device for header data of a second header data type that has been coupled with the value 3 will be reconstructed and subsequently converted on the side of the receiver device.

LIST OF REFERENCE CHARACTERS

10 First computer
11 Router device
12 Router device
13 Router device
20 Second computer
30 Transmission pathway of the data packet

The invention claimed is:

1. A method for transmitting a data packet in a network, wherein the data packet has a header field containing header data relevant to transmission and a user field, wherein at least one data field containing header data of a first header data type is provided in the header field, said data field being designed as a TTL field (Time-to-Live field) and wherein the data packet is transmitted from a transmitter device to a receiver device, is hereby characterized in that in the at least one TTL field, in addition to the header data of the first header data type, header data of at least one second header data type are transmitted, in that the TTL field has a number of bits, in that header data of the first header data type are or will be included in a first sub-number of bits and in that header data of the at least one second header data type are or will be included in at least one second sub-number of bits.

2. The method according to claim 1, further characterized in that the header data of the at least one second header data type that are transmitted to the receiver device are reconstructed and/or evaluated and/or used by the receiver device.

3. The method according to claim 1 or 2, further characterized in that the transmitter device and the receiver device are designed as a router device.

4. A method for configuring a data packet that is transmitted in a network from a transmitter device to a receiver device, wherein the data packet has a header field containing header data relevant to transmission and a user field, and wherein at least one data field containing header data of a first header data type is provided in the header field, and wherein the data field is designed as a TTL field (Time-to-Live field) is hereby characterized in that in the at least one TTL field, in addition to the header data of the first header data type, header data of at least one second header data type are also included, in that the TTL field has a number of bits, in that header data of the first header data type are or will be included in a first sub-number of bits and in that header data of the at least one second header data type are or will be included in at least one second sub-number of bits.

5. The method according to claim 1 or 4, further characterized in that the header data of the at least one second header data type contain information on the local processing of the data packet.

6. The method according to claim 1 or 4, further characterized in that the header data of the at least one second header data type contain information on the decoding and/or the encrypting and/or the routing policy and/or the virtual context.

7. The method according to claim 1 or 4, further characterized in that the method is designed for transmitting or configuring an IP packet that is transmitted over the Internet from a transmitter device to a receiver device.

8. The method according to claim 1, further characterized in that in the TTL field, five or six or seven bits are used or will be used for the header data of the first header data type, and three or two or one bit(s) are used or will be used for the transmission of header data of the at least one second header data type.

9. The method according to claim 1, further characterized in that the bits used for the transmission of header data of the at least one second header data type span a range of values and that information on the local processing of the data packet will be or are assigned at least to individual values of this value range.

10. The method according to claim 1, further characterized in that a value of the TTL field will be set in the transmitter device from the header data of the first header data type and at least one second header data type, that the value of the TTL field containing the data packet will be transmitted to the receiver device, and that in the receiver device, at least header data of the at least one second header data type will be reconstructed from the transmitted value of the TTL field.

11. The method according to claim 10, further characterized in that a value of the TTL field will be set in the transmitter device from the header data of the first header data type and the header data of at least one second header data type according to the following formula:

$$TTL \text{ field value} = 2^{\text{bit number of header data of the first header data type}} * k - 1,$$

wherein the variable k corresponds to a value set by the transmitter device that is referred to the header data of the at least one second header data type.

12. The method according to claim 11 further characterized in that a value is set by the transmitter device for the variable k, which is selected from the value range spanned by the bits that are used for the transmission of header data of the at least one second header data type, and are assigned to the information on the local processing of the data packet.

13. The method according to claim 10, further characterized in that header data of the at least one second header data type will be reconstructed in the receiver device from the transmitted value of the TTL field according to the following formula:

$$k = \text{quotient}(TTL \text{ field value} / 2^{\text{bit number of the header data of the first header data type}}) + 1$$

wherein the variable k corresponds to a value set by the transmitter device that is referred to the header data of the at least one second header data type, and wherein quotient denotes division into a whole number.

\* \* \* \* \*